United States Patent
Kameda

(10) Patent No.: US 9,205,862 B2
(45) Date of Patent: Dec. 8, 2015

(54) STEERING CONTROL DEVICE

(71) Applicant: TOYOTA JIDOSHA KABUSHIKI KAISHA, Toyota-shi, Aichi (JP)

(72) Inventor: Yoshikazu Kameda, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/611,386

(22) Filed: Feb. 2, 2015

(65) Prior Publication Data

US 2015/0239495 A1    Aug. 27, 2015

(30) Foreign Application Priority Data

Feb. 25, 2014  (JP) .................................. 2014-034597

(51) Int. Cl.
  *B62D 5/04*    (2006.01)
  *B62D 5/00*    (2006.01)

(52) U.S. Cl.
  CPC ............ *B62D 5/0466* (2013.01); *B62D 5/0469* (2013.01); *B62D 5/005* (2013.01)

(58) Field of Classification Search
  CPC ..... B62D 5/0466; B62D 5/0469; B62D 5/005
  See application file for complete search history.

(56) References Cited

U.S. PATENT DOCUMENTS

| | | | | |
|---|---|---|---|---|
| 5,182,711 A | * | 1/1993 | Takahashi et al. | 701/41 |
| 2006/0042859 A1 | * | 3/2006 | Itoh | 180/402 |
| 2009/0055050 A1 | * | 2/2009 | Onuma et al. | 701/43 |
| 2011/0257845 A1 | * | 10/2011 | Niki et al. | 701/41 |
| 2011/0264329 A1 | * | 10/2011 | Limpibunterng et al. | 701/41 |
| 2014/0005894 A1 | * | 1/2014 | Aoki | 701/43 |

FOREIGN PATENT DOCUMENTS

| | | | | |
|---|---|---|---|---|
| JP | 2005-082119 A | 3/2005 | | |
| JP | 2009-274692 A | 11/2009 | | |
| WO | WO 2007034108 A1 | * | 3/2007 | ............... B62D 5/04 |
| WO | 2014/087546 A1 | 6/2014 | | |

* cited by examiner

*Primary Examiner* — Rodney Butler
(74) *Attorney, Agent, or Firm* — Sughrue Mion, PLLC

(57) ABSTRACT

A steering control device includes: an assist controller configured to carry out, by an assist torque, an assist control of alleviating an operation force of a steering wheel; an assist torque computer configured to compute a target assist torque in which an attenuation torque for suppressing a steering angle speed of the steering wheel is superimposed on a reference torque; and an active-passive determination processor configured to compute a steering mode determination value representing a steering mode by a driver with respect to the steering wheel in accordance with a product of the steering angle speed and a steering torque at a time of a steering operation of the steering wheel by the driver as well as a product of the steering angle and a time differential value of the steering torque at the time of the steering operation.

2 Claims, 6 Drawing Sheets

STEERING CONTROL DEVICE

CROSS-REFERENCE TO RELATED APPLICATIONS

The present application claims priority to and incorporates by reference the entire contents of Japanese Patent Application No. 2014-034597 filed in Japan on Feb. 25, 2014.

BACKGROUND OF THE INVENTION

1. Field of the Invention

The present invention relates to a steering control device that carries out a steering assisting control with respect to a steering operation of a driver.

2. Description of the Related Art

Conventionally, a steering assisting control (assist control) that alleviates an operation force of a steering wheel of the driver by generating an assist torque at the time of the steering operation is known. This type of steering control device is, for example, disclosed in Japanese Patent Application Laid-open No. 2005-082119 and Japanese Patent Application Laid-open No. 2009-274692. If the steering operation is a turning operation, an impact load is generated when a steering angle becomes a maximum steering angle (at the time of end abutting). Thus, conventionally, for example, when the steering angle approaches the maximum steering angle, an attenuation torque of a dumping control is increased and the assist torque is reduced to suppress the impact load at the time of the end abutting. Furthermore, for example, in the steering control device described in Japanese Patent Application Laid-open No. 2005-082119, when the steering operation is the turning operation, the assist torque is reduced from the time of a steering angle before the maximum steering angle by a first predetermined angle (angle that is greater as the steering speed becomes greater) to reduce the impact load at the time of the end abutting. Moreover, in the steering control device, if the steering operation is a turning-back operation, the assist torque is increased to a maximum value (assist gain Ga=1) while the steering angle reaches a second predetermined angle (<first predetermined angle) from the maximum steering angle to ensure a satisfactory steering feeling at the time of the turning-back operation. The steering control device described in Japanese Patent Application Laid-open No. 2009-274692 detects that the steering angle reached a steering limit (maximum steering angle) when a change rate of the steering torque exceeds a predetermined value, and drive controls a motor in a direction an absolute value of the steering angle becomes small at the relevant time to reduce the impact load at the time of the end abutting.

In the conventional steering control device, the assist torque for the turning-back operation cannot be generated unless the turning-back operation is detected. Thus, the conventional steering control device does not switch from the dumping control of the turning operation to the dumping control of the turning-back operation until the turning-back operation is detected even if the turning-back operation is started from the maximum steering angle or the vicinity thereof, and hence the driver may feel a sense of uncomfortableness (i.e., catching feeling) at the instant the turning-back operation is started.

There is a need for a steering control device capable of suppressing the sense of uncomfortableness of the driver at the time of the turning-back operation.

SUMMARY OF THE INVENTION

It is an object of the present invention to at least partially solve the problems in the conventional technology.

A steering control device according to one aspect of the present invention includes: an assist controller configured to carry out, by an assist torque, an assist control of alleviating an operation force of a steering wheel by a driver; an assist torque computer configured to compute a target assist torque in which an attenuation torque for suppressing a steering angle speed of the steering wheel is superimposed on a reference torque; and an active-passive determination processor configured to compute a steering mode determination value representing a steering mode by the driver with respect to the steering wheel in accordance with a product of the steering angle speed and a steering torque at a time of a steering operation of the steering wheel by the driver as well as a product of the steering angle and a time differential value of the steering torque at the time of the steering operation, wherein the assist torque computer is configured to increase the attenuation torque when an absolute value of the steering angle of the steering wheel at the time of a turning operation is not smaller than a predetermined angle compared to the attenuation torque when the absolute value of the steering angle is smaller than the predetermined angle, and to reduce the increased attenuation torque at a time the steering mode determination value becomes smaller than a predetermined value when the absolute value of the steering angle at the time of the turning operation is not smaller than the predetermined angle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a steering control device according to the present invention will be hereinafter described in detail based on the drawings. The invention is not limited by the embodiment.

An embodiment of a steering control device according to the present invention will be described based on FIGS. 1 to 7.

Figure 1:
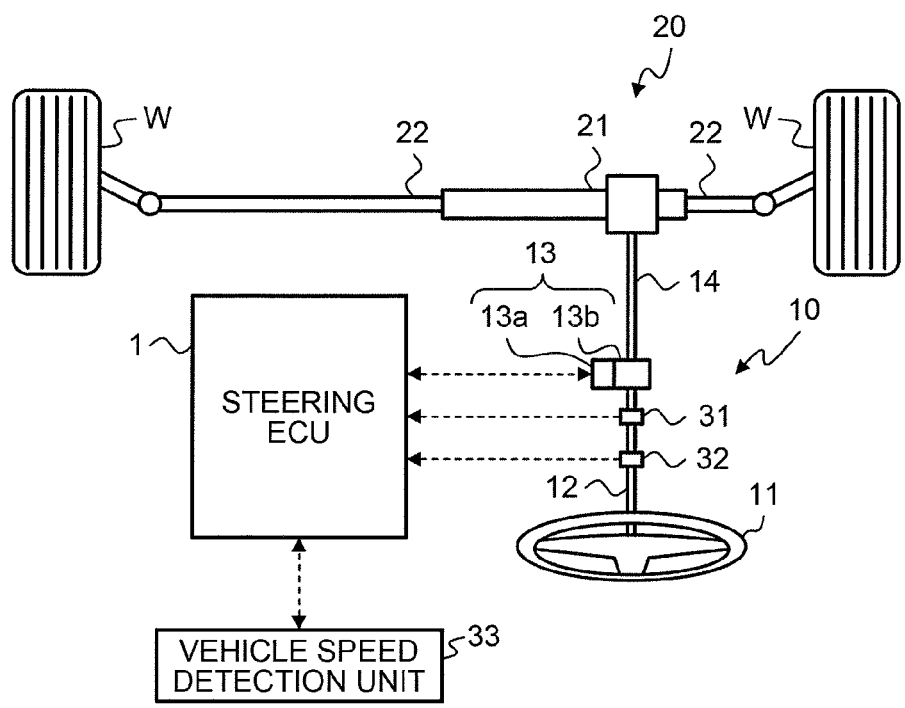
FIG. 1 is a view illustrating a configuration of a steering control device according to an embodiment of the present invention.

The steering control device of the present embodiment includes an electronic control device (hereinafter referred to as "steering ECU") 1 that carries out an arithmetic processing associated with a steering control, to be described later (FIG. 1).

A steering device 10, which is a control target of the steering ECU 1, will be described along with a turning device 20.

The steering device 10 is a device that carries out a steering operation when the driver turns a turning wheel W of a vehicle, and includes a steering wheel 11, and a rotation shaft (hereinafter referred to as "steering shaft") 12 coupled to the steering wheel 11.

The steering device 10 includes a steering angle detection unit 31 that detects a steering angle θs at the time of the steering operation and a steering torque detection unit 32 that detects a steering torque Ts at the time of the steering operation. The steering angle detection unit 31 is an angle sensor that detects a rotation angle of the steering shaft 12 with respect to a neutral position of the steering wheel 11 as a steering angle θs. The steering angle detection unit 31 can also detect the direction of the steering angle θs with respect to the neutral position of the steering wheel 11 along with the steering angle θs. The steering torque detection unit 32 is, for example, a resolver sensor, and the like arranged on the steering shaft 12, and detects the magnitude of the steering torque Ts with respect to the neutral position of the steering wheel 11.

The turning device 20 turns a front wheel serving as a turning wheel W by a turning angle θwf corresponding to a rotation angle of an output shaft 14 of the steering device 10. The output shaft 14 is coupled to the steering shaft 12. The turning device 20 includes a gear mechanism 21 that converts a rotation torque transmitted from the output shaft 14 to a turning force (axial force). For example, the gear mechanism 21 is a so-called rack and pinion mechanism including a rack gear and a pinion gear (not illustrated). The gear mechanism 21 turns the turning wheel W by transmitting the turning force to the turning wheel W through each of a left and right tie rods 22.

The steering device 10 of the present embodiment is configured as an electronic power steering (EPS) device that assists the steering operation of the driver. Thus, the steering device 10 can perform an assist control of acting the assist torque on the steering shaft 12 at the time of the steering operation of the driver, and alleviating the operation force of the steering wheel 11 of the driver by such assist torque.

When carrying out the assist control, various compensation controls are performed to give an appropriate steering feeling to the driver. The compensation control is, for example, a dumping control, a friction control, a return control, and the like. The dumping control is a control for suppressing the steering angle speed θs' of the steering wheel 11 by an attenuation torque (compensation torque) to compensate for the astringency of the steering wheel 11 or to compensate for the response feeling (return feeling) at the time of the steering operation. The friction control is a control for compensating the friction by a friction torque (compensation torque) to suppress the degradation of the steering feeling by the friction of a slidably moving portion, and the like of the steering device 10. The return control is a control for smoothly returning the steering wheel 11 to the neutral position (steering angle θs=0) by the return torque (compensation torque).

The attenuation torque in the assist control is computed according to the steering angle speed θs' and the vehicle speed V. The steering angle speed θs' may be obtained as a time differential value of the steering angle θs detected by the steering angle detection unit 31 or may be detected by arranging a steering angle speed detection unit (not illustrated). The vehicle speed V is detected by a vehicle speed detection unit 33. A rotation sensor that detects the rotation of the output shaft of a transmission in a power transmitting device (not illustrated), a wheel speed sensor that detects a wheel speed, and the like, for example, are used for the vehicle speed detection unit 33. The friction torque in the assist control is computed according to the steering angle θs and the vehicle speed V. The return torque in the assist control is computed according to the steering angle θs, the steering angle speed θs', and the vehicle speed V.

Figure 2:
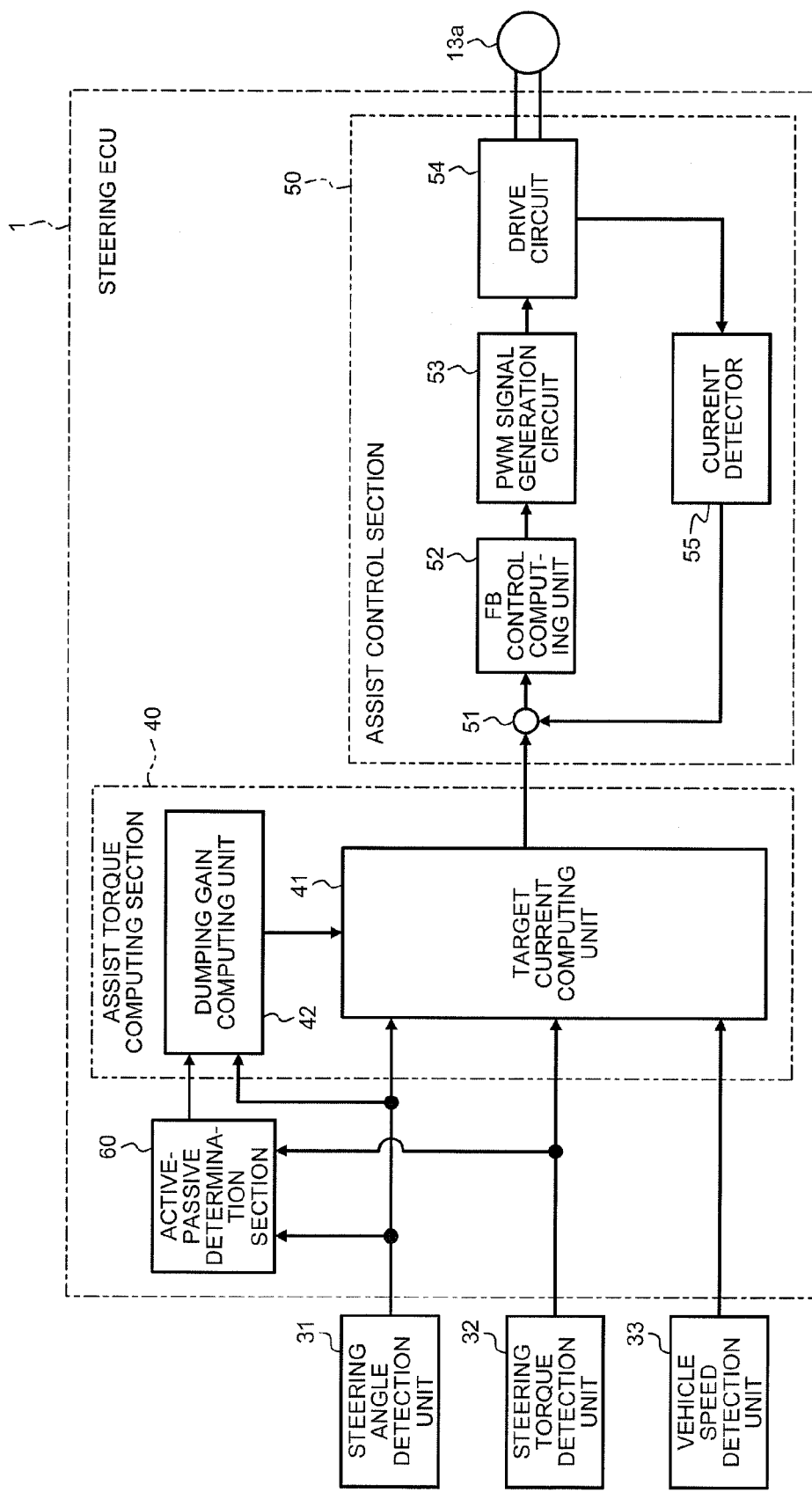
FIG. 2 is a block diagram illustrating a specific configuration of the steering control device according to the embodiment of the present invention.

In the steering device 10, for example, the respective compensation torques are superimposed on a reference torque, and such torque is set as a target value (hereinafter referred to as "target assist torque") of the assist torque to perform the assist control. The reference torque is the assist torque that becomes a reference in the assist control, and is computed according to the steering torque Ts and the vehicle speed V. The steering ECU 1 includes an assist torque computing section 40 that computes the target assist torque (FIG. 2).

When carrying out the assist control, the target assist torque is generated in a steering assist unit 13. The steering assist unit 13 is arranged as an actuator of the steering device 10, and includes an electrical motor 13a and a speed reducer 13b, for example. The speed reducer 13b, for example, includes a plurality of gear wheels, where one gear wheel is fixed to the concentric steering shaft 12 and another gear wheel is fixed to an output shaft of the electrical motor 13a. The steering assist unit 13 can transmit the output torque of the electrical motor 13a to the steering shaft 12 through the speed reducer 13b to cause the steering shaft 12 to generate the assist torque. The operation of the electrical motor 13a is controlled by an assist control section 50 of the steering ECU 1 (FIG. 2).

Specifically, the assist torque computing section 40 includes a target current computing unit 41. The target current computing unit 41 computes a target value (hereinafter referred to as "target assist current value") of the current to supply to the electrical motor 13a. The target assist current value is a current value that can generate the target assist torque in the steering assist unit 13 by being supplied to the electrical motor 13a. The target assist current value is computed based on the current value (attenuation current value) corresponding to the attenuation torque, the current value (friction current value) corresponding to the friction torque, and the current value (return current value) corresponding to the return torque with respect to the current value (reference current value) corresponding to the reference torque. Thus, the target current computing unit 41 carries out the computation of the target assist current value based on the respective detection values of the steering angle detection unit 31, the steering torque detection unit 32, and the vehicle speed detection unit 33.

The target assist current value is provided to the assist control section 50. The assist control section 50 includes a subtractor 51, an FB control computing unit 52, a PWM signal generation circuit 53, a drive circuit 54, and a current detector 55. The subtractor 51 computes a deviation of the target assist current value and the current value detected in the current detector 55. The FB control computing unit 52 computers a command value with respect to the PWM signal generation circuit 53. The command value is a command value for feedback control generated by a proportional-integral control computation based on the deviation of the subtractor 51. The PWM signal generation circuit 53 generates a pulse width modulation signal (PWM signal) having a duty ratio corresponding to the command value. The drive circuit 54 applies a voltage corresponding to the (pulse width) of the duty ratio of the PWM signal to the electrical motor 13a to generate the target assist torque in the steering assist unit 13. The current detector 55 detects the current value flowing to the electrical motor 13*a*.

If the steering operation of the driver is a turning operation, the impact load is transmitted to the driver through the steering wheel 11 when the steering angle θs becomes the maximum steering angle θs$_{max}$ (hereinafter referred to as "time of end abutting") in either the left or the right. Here, the steering operation of increasing the steering angle θs to either the left or the right from the neutral position (θs=0) of the steering wheel 11 is called the turning operation. The steering operation of reducing the steering angle θs toward the neutral position from the turning state is called a turning-back operation. The turning state and the state of holding the steering wheel 11 at the neutral position are referred to as steering retention.

In order to alleviate the impact load at the time of the end abutting, the attenuation torque is increased at the maximum steering angle θs$_{max}$ and the vicinity of the maximum steering angle θs$_{max}$ to increase the dumping effect of the dumping control compared to when the steering angle θs is on the neutral position side. At the time of the turning-back operation, if the attenuation torque is remained increased, the dumping effect at the time of the turning operation is remained and the assist torque is remained reduced, so that the steering feeling becomes heavy. At the time of the turning-back operation, the increased attenuation torque needs to be reduced. In this case, the performance of the turning-back operation needs to be detected. However, the time from when the turning-back operation is performed until such performance is detected, and the time from when the performance of the turning-back operation is detected until the attenuation torque is actually reduced are required from when the turning-back operation is performed until the attenuation torque is actually reduced. Thus, when the turning-back operation is carried out from the maximum steering angle θs$_{max}$ or the vicinity of the maximum steering angle θs$_{max}$, the dumping effect by the attenuation torque at the time of the turning operation remains from when the turning-back operation is performed until the attenuation torque is actually reduced, and thus the driver may feel a catching feeling and a sense of uncomfortableness.

The assist torque computing section 40 computes the target assist torque to satisfy both the alleviation of the impact load at the time of the end abutting in the turning operation and the suppression of the catching feeling of when the turning-back operation is carried out from the maximum steering angle θs$_{max}$ or the vicinity of the maximum steering angle θs$_{max}$. Thus, in the steering device 10, a power (hereinafter referred to as "steering power") J(t) related to the steering operation of the driver is computed, and whether the steering mode of the driver is the active steering or the passive steering is determined based on the steering power J(t). The steering ECU 1 includes an active-passive determination section 60 for computing the steering power J(t) and determining the steering mode.

The steering power J(t) is a steering mode determination value representing the steering mode of the driver with respect to the steering wheel 11. The active-passive determination section 60 computes the steering power J(t) based on the respective detection values of the steering angle detection unit 31 and the steering torque detection unit 32, that is, based on the parameter related to the steering angle θs and the parameter related to the steering torque Ts at the time of the steering operation. The parameter related to the steering angle θs is the steering angle θs itself and the steering angle speed θs', which is a time differential value of the steering angle θs. The parameter related to the steering torque Ts is the steering torque Ts itself and the time differential value (hereinafter referred to as "steering torque differential value") Ts' of the steering torque Ts.

Figure 3:
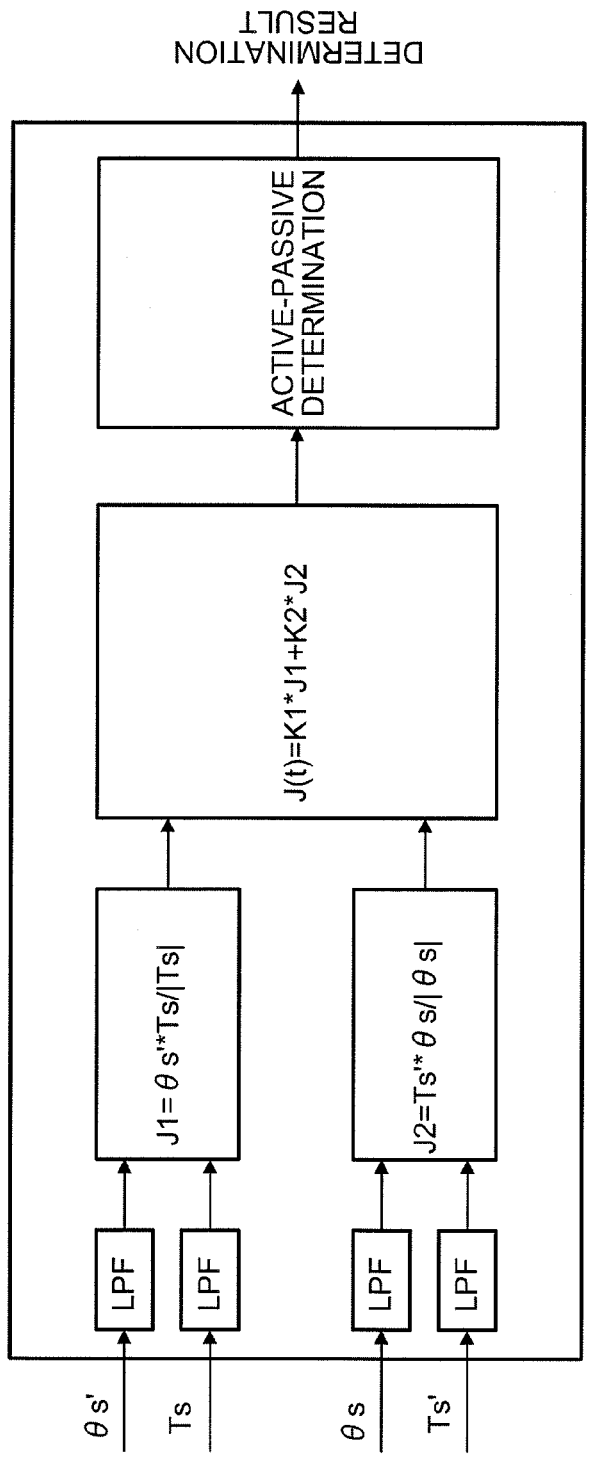
FIG. 3 is a view describing an active-passive determination.

As illustrated in FIG. 3 and the following equation 1-3, the steering power J(t) is computed using a first steering power J1 and a second steering power J2.

$$J1 = \theta s' * Ts/|Ts| \tag{1}$$

$$J2 = Ts' * \theta s/|\theta s| \tag{2}$$

$$J(t) = K1 * J1 + K2 * J2 \tag{3}$$

The first steering power J1 is the product of the steering angle speed θs', the steering torque Ts and the absolute value of the inverse number of the steering torque Ts at the time of the steering operation. The second steering power J2 is the product of the steering torque differential value Ts', the steering angle θs and the absolute value of the inverse number of the steering angle θs at the time of the steering operation. "K1" and "K2" in the formula 3 are coefficients. That is, the steering power J(t) is computed based on the product of the steering angle speed θs', the steering torque Ts and the absolute value of the inverse number of the steering torque Ts at the time of the steering operation, and the product of the steering torque differential value Ts', the steering angle θs and the absolute value of the inverse number of the steering angle θs at the time of the steering operation.

The active steering is the turning operation and the turning-back operation forcibly (actively) carried out intentionally by the driver. The passive steering is the steering mode other than the active steering. Specifically, the passive steering is the steering retention carried out by the driver when a restoring force by the self-aligning torque of the front wheel, an external force such as a road surface input, and the like are transmitted to the steering wheel 11. That is, the passive steering is the steering retention carried out to retain the steering angle θs during the turning (turning radius is unchanged) constant, and the steering retention carried out to retain the straight advancing state at the neutral position of the steering wheel 11. The passive steering also includes the steering retention at the neutral position of the steering wheel 11 under a state the external force is not transmitted. Furthermore, the passive steering includes the turning-back operation (different from the active turning-back operation) carried out by the driver while relying on the restoring force of the self-aligning torque.

For example, at the vicinity of the maximum steering angle θs$_{max}$ at the time of the turning operation of the right turn, when the turning operation is forcibly carried out (in the case of the active steering), the steering angle θs (>0) is large, the steering angle speed θs' (>0) is large, the steering torque Is (>0) is large, and the steering torque differential value Ts' (>0) is large. When the turning operation is passively carried out (in the case of the passive steering) at the vicinity of the maximum steering angle θs$_{max}$, the steering angle θs (>0) is large, the steering angle speed θs' (>0) is substantially zero, the steering torque Is (>0) is large, and the steering torque differential value Ts' (>0) is large. At the vicinity of the maximum steering angle θs$_{max}$ at the time of the turning operation, a large difference is created in the steering angle speed θs' between the active steering and the passive steering regardless of the turning direction, and thus the steering power J(t) at the time of the active steering indicates a greater value than the steering power J(t) at the time of the passive steering. Thus, a numerical value Jc of the steering power J(t) enabling an identification of the active steering and the passive steering at the vicinity of the maximum steering angle $\theta s_{max}$ at the time of the turning operation is set as a threshold value. The active-passive determination section 60 determines as the turning operation by the active steering if the steering power J(t) at the vicinity of the maximum steering angle $\theta s_{max}$ is greater than or equal to a predetermined value Jc serving as a threshold value, and as the turning operation by the passive steering if the steering power J(t) is smaller than the predetermined value Jc.

At the vicinity of the maximum steering angle $\theta s_{max}$ at the time of the turning operation, the dumping control is carried out based on the determination result of the active-passive determination.

Specifically, when the absolute value of the steering angle $\theta s$ at the time of the turning operation becomes the predetermined angle $\theta sc$ (|$\theta s$|=$\theta sc$), determination is made that the steering angle $\theta s$ reached the vicinity of the maximum steering angle $\theta s_{max}$, and thereafter, the attenuation torque is increased from the neutral position side (hereinafter referred to as "normal time"), which is the state up to this time, and the target assist torque is reduced. In this way, the steering control device can alleviate the impact load at the time of the end abutting. The predetermined angle $\theta sc$ is to be determined, for example, based on the absolute value of the steering angle $\theta s$ of the increase starting point of the attenuation torque similar to the prior art.

The attenuation torque is increased when the turning operation by the active steering is carried out to obtain the effect of alleviating the impact load at the time of the end abutting. Thus, the attenuation torque is desirably increased when the absolute value of the steering angle $\theta s$ at the time of the turning operation becomes the predetermined angle $\theta sc$ and the determination result of the active-passive determination is the active steering, and does not necessarily need to be increased when the determination result of the active-passive determination is the passive steering. Therefore, the active-passive determination section 60 starts the active-passive determination when the absolute value of the steering angle $\theta s$ becomes the predetermined angle $\theta sc$ (|$\theta s$|=$\theta sc$) at the time of the turning operation at the latest.

In the case where the determination result of the active-passive determination is the active steering, determination is made that the turning operation is still being forcibly carried out and the increase of the attenuation torque is continued. Since the steering feeling gradually becomes heavier with the increase in the attenuation torque, the steering mode of the driver is shifted to the turning operation by the passive steering as the degree of the active steering reduces little by little. Even if the switch to the turning operation by the passive steering accompanying the increase in the attenuation torque is not made, the steering mode is shifted to the turning operation by the passive steering, and then switch is made to the steering retention steering or the turning-back operation when switching from the turning operation to the steering retention steering or when switching from the turning operation to the turning-back operation at the vicinity of the maximum steering angle $\theta s_{max}$. Thus, in the active-passive determination section 60, determination is changed from the determination as the active steering to the determination as the passive steering at the vicinity of the maximum steering angle $\theta S_{max}$. Therefore, when the determination result becomes the passive steering, determination is made that the switch is made to the passive turning operation, and the increased attenuation torque is reduced even in the middle of the turning operation to increase the target assist torque. The attenuation torque is made smaller than the attenuation torque increased to alleviate the impact load at the time of the end abutting. In the illustration, the attenuation torque is reduced to the magnitude of the normal time. Therefore, in the subsequent turning-back operation, the attenuation torque is already reduced even if the performance of the turning-back operation is not detected, and thus the catching feeling from the moment the turning-back operation is started is suppressed.

That is, the assist torque computing section 40 increases the attenuation torque when the absolute value of the steering angle $\theta s$ at the time of the turning operation is greater than or equal to the predetermined angle $\theta sc$ compared to when the absolute value of the steering angle $\theta s$ is smaller than the predetermined angle $\theta sc$, and reduces the increasing attenuation torque if the steering power (steering mode determination value) J(t) becomes smaller than the predetermined value Jc when the absolute value of the steering angle $\theta s$ at the time of the turning operation is greater than or equal to the predetermined angle $\theta sc$. The assist torque computing section 40 includes a dumping gain computing unit 42 to increase or decrease the attenuation torque. The dumping gain computing unit 42 computes the gain (hereinafter referred to as "dumping gain") Gd of the attenuation current value, and computes the dumping gain Gd corresponding to the steering angle $\theta s$.

Figure 4:
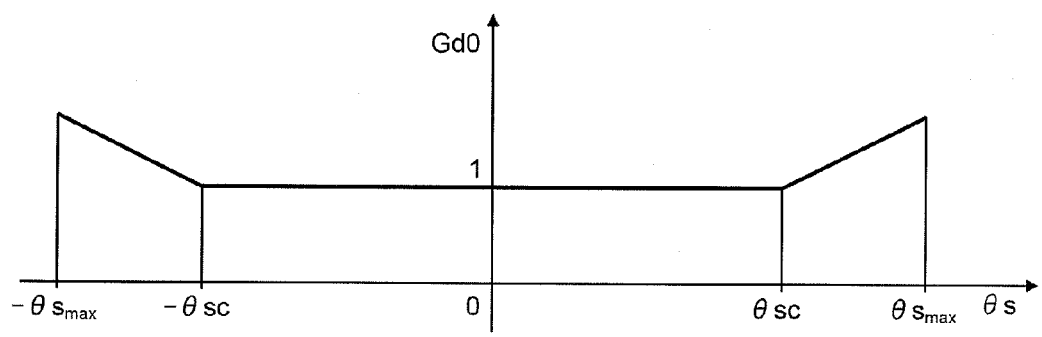
FIG. 4 is an example of a reference map representing a correspondence relationship of a steering angle and a reference dumping gain.

In the illustration, a reference map representing a correspondence relationship of the steering angle $\theta s$ and a reference dumping gain Gd0 is prepared (FIG. 4). The dumping gain computing unit 42 sets the reference dumping gain Gd0 as the dumping gain Gd as is when the active-passive determination is not performed or when determined as the active steering. The dumping gain computing unit 42 corrects the reference dumping gain Gd0 and sets the corrected reference dumping gain as the dumping gain Gd.

The reference map of FIG. 4 is provided to derive the reference dumping gain Gd0 corresponding to the steering angle $\theta s$ at the time of the turning operation. For example, in the reference map, the reference dumping gain Gd0 at the normal time is assumed as one (Gd0=1). That is, in such reference map, the reference dumping gain Gd0 is assumed as one (Gd0=1) until the steering angle $\theta s$ reaches the vicinity of the maximum steering angle $\theta s_{max}$ from the neutral position ($-\theta sc<\theta s<\theta sc$). When the steering angle $\theta s$ is at the maximum steering angle $\theta s_{max}$ and at the vicinity of the maximum steering angle $\theta s_{max}$ ($-\theta s_{max} \leq \theta s \leq -\theta sc$, $\theta sc \leq \theta s \leq \theta s_{max}$), the reference dumping gain Gd0 is gradually made greater than one as the steering angle $\theta s$ approaches the maximum steering angle $\theta s_{max}$ (Gd0>1).

Figure 5:
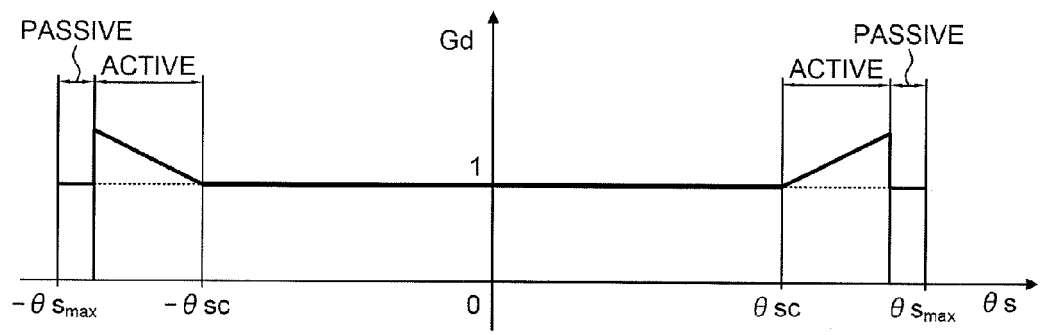
FIG. 5 is an example of a map representing a correspondence relationship of the steering angle and the dumping gain.
Figure 6:
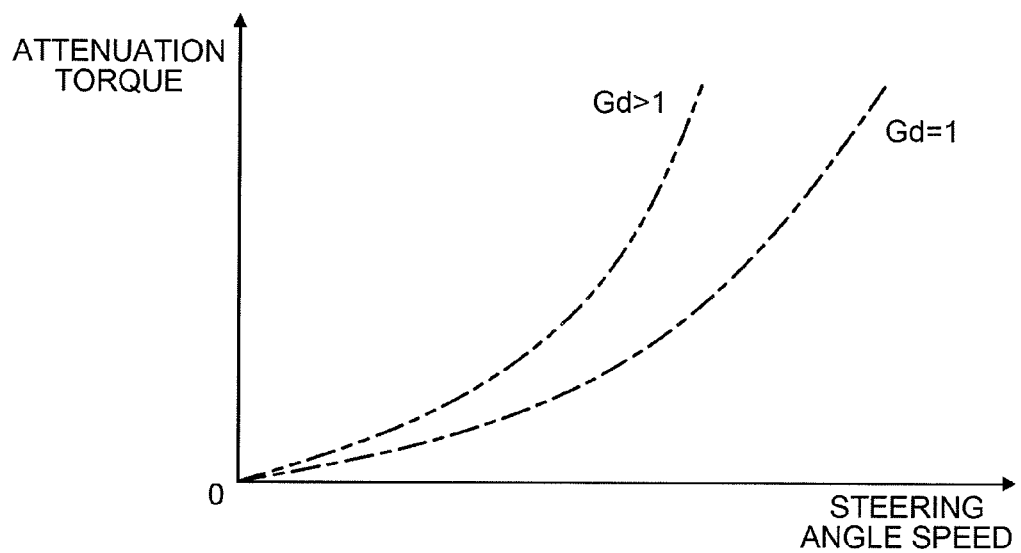
FIG. 6 is a view illustrating an example of an attenuation torque corresponding to a steering angle speed and the dumping gain.

The dumping gain computing unit 42 reads the reference dumping gain Gd0 corresponding to the steering angle $\theta s$ from the reference map at the time of the turning operation. The dumping gain computing unit 42 sets the reference dumping gain Gd0 as the dumping gain Gd as is if at the steering angle $\theta s$ of the normal time ($-\theta sc<\theta s<\theta sc$) (FIG. 5). After the steering angle $\theta s$ reaches the vicinity of the maximum steering angle $\theta s_{max}$ ($\theta s \leq -\theta sc$, $\theta s \geq \theta sc$), the dumping gain computing unit 42 sets the reference dumping gain Gd0 (>1) as the dumping gain Gd as is if the determination result of the active-passive determination is the active steering, and sets the dumping gain Gd to smaller than the reference dumping gain Gd0 (>1) or one if the determination result is the passive steering (FIG. 5). FIG. 6 illustrates one example of the attenuation torque of when the dumping gain Gd is one and the attenuation torque corresponding to the steering angle speed $\theta s'$ of when the dumping gain Gd is greater than one.

The dumping gain computing unit 42 transmits information of the set dumping gain Gd to the target current computing unit 41. In the target current computing unit 41, the dumping gain Gd is multiplied to the attenuation current value, and the target assist current value is computed using the dumping gain Gd of after the multiplication. Thus, at the vicinity of the maximum steering angle $\theta s_{max}$ in the turning operation, the attenuation torque is increased than the normal time in the case of the active steering, whereby the impact load at the time of the end abutting can be alleviated. At the time the turning operation is terminated and the driver shifts to the active turning-back operation, the attenuation torque is already reduced if determination is made as the passive steering in the middle of the turning operation, and thus the catching feeling from the moment the turning-back operation started can be suppressed even if the performance of the turning-back operation is not detected. The driver barely feels the catching feeling since the dumping control is carried out depending on the steering angle speed $\theta s'$ when the passive turning-back operation is carried out.

Figure 7:
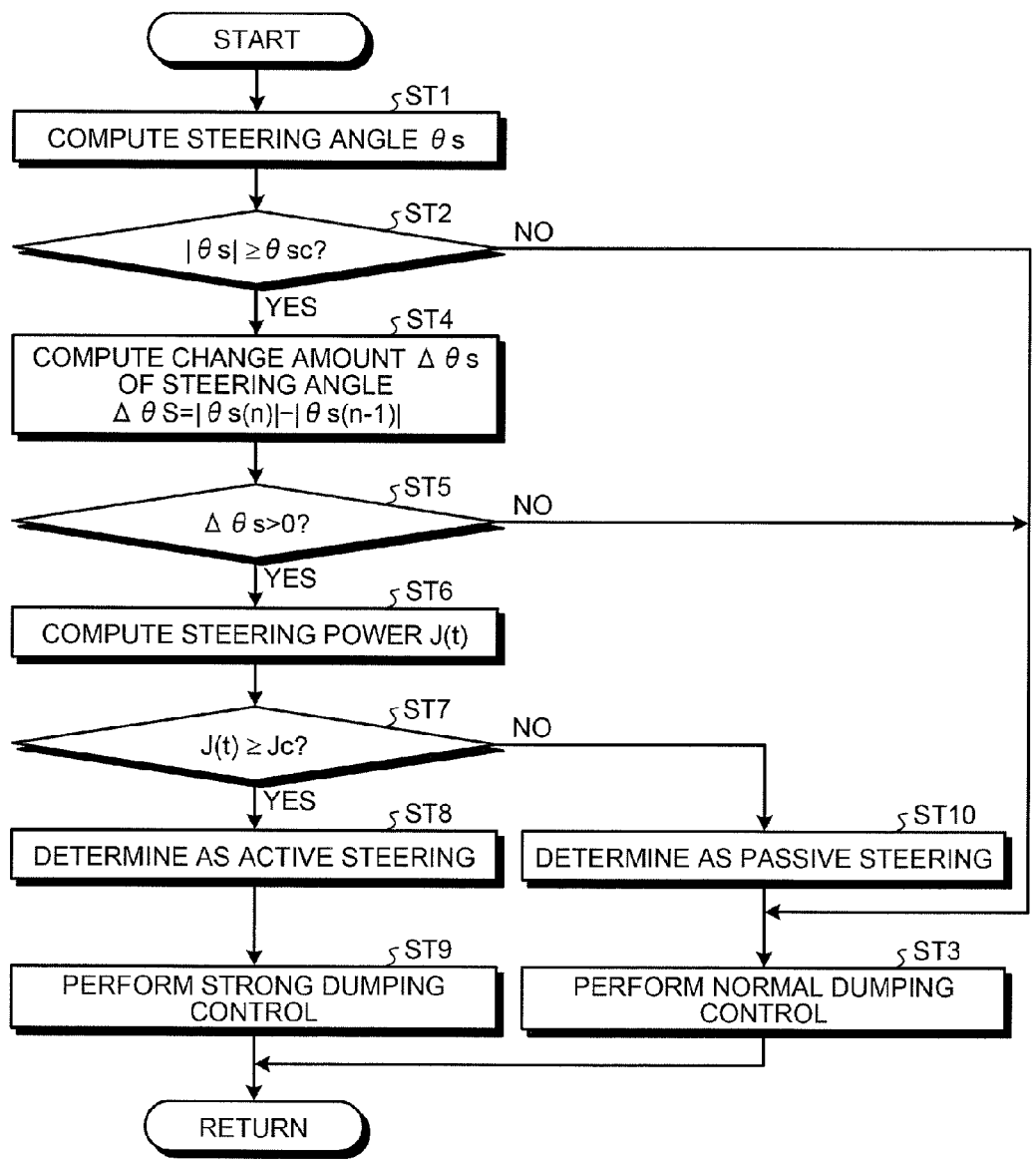
FIG. 7 is a flowchart describing an arithmetic processing operation of the steering control device according to the embodiment of the present invention.

A series of flow will be described based on the flowchart of FIG. 7.

For example, the steering ECU 1 computes the steering angle $\theta s$ based on the detection signal of the steering angle detection unit 31 (step ST1), and determines whether or not the absolute value of the steering angle $\theta s$ is greater than or equal to the predetermined angle $\theta sc$ (step ST2).

If the absolute value of the steering angle $\theta s$ is smaller than the predetermined angle $\theta sc$, that is, is the steering angle $\theta s$ at the normal time, the steering ECU 1 performs the dumping control (hereinafter referred to as "normal dumping control") based on the dumping gain Gd=1 at the normal time (step ST3), and returns to step ST1. In this case, the dumping gain computing unit 42 sets the dumping gain Gd to one, and the target current computing unit 41 computes the attenuation current value based on the dumping gain Gd=1. The target current computing unit 41 computes the target assist current value based on the relevant attenuation current value.

If the absolute value of the steering angle $\theta s$ is greater than or equal to the predetermined angle $\theta sc$, the steering angle $\theta s$ reaches the vicinity of the maximum steering angle $\theta s_{max}$, and thus a steering direction determination unit (not illustrated) of the steering ECU 1 calculates the change amount $\Delta \theta s$ (=|$\theta s$(n)|−|$\theta s$(n−1)|) of the steering angle $\theta s$ (step ST4). For example, "$\theta s$(n)" is the most recent detection value. "$\theta s$(n−1)" is the detection value of one step before.

The steering direction determination unit determines whether or not the change amount $\Delta \theta s$ of the steering angle $\theta s$ is greater than 0 (step ST5). That is, in step ST5, determination on whether the steering operation of the driver is the turning operation ($\Delta \theta s > 0$), the turning-back operation ($\Delta \theta s < 0$), or the steering retention ($\Delta \theta s = 0$) is made.

If the change amount $\Delta \theta s$ of the steering angle $\theta s$ is smaller than or equal to zero (in the case of the turning-back operation or the steering retention at the vicinity of the maximum steering angle $\theta s_{max}$), the steering ECU 1 proceeds to step ST3 to perform the normal dumping control, and returns to step ST1.

On the other hand, if the change amount $\Delta \theta s$ of the steering angle $\theta s$ is greater than zero (in the case of the turning operation at the vicinity of the maximum steering angle $\theta s_{max}$), r the active-passive determination section 60 of the steering ECU 1 computes the steering power J(t) as described above (step ST6), and determines whether or not the steering power J(t) is greater than or equal to the predetermined value Jc (step ST7). Upon calculating the steering power J(t), the steering angle $\theta s$, the steering angle speed $\theta s'$, the steering torque Ts, and the steering torque differential value Ts' are passed through a low-pass filter (LPF) to remove noise at the time of the detection, and the like (FIG. 3).

If the steering power J(t) is greater than or equal to the predetermined value Jc, the active-passive determination section 60 determines that the steering mode of the driver is the active steering (step ST8). In this case, the steering ECU 1 performs a dumping control (hereinafter referred to as "strong dumping control") in which the attenuation torque is increased than the normal dumping control (step ST9), and returns to step ST1. In this case, the dumping gain computing unit 42 sets the dumping gain Gd to a value greater than one, and the target current computing unit 41 computes the attenuation current value based on the dumping gain Gd (>1). The target current computing unit 41 then computes the target assist current value based on the attenuation current value. The strong dumping control is performed while the turning operation by the active steering is continued. Thus, even if the steering angle $\theta s$ is cut in up to the maximum steering angle $\theta s_{max}$ thereafter, the impact load at the time of the end butting is alleviated in such a case.

If the steering power J(t) is smaller than the predetermined value Jc, the active-passive determination section 60 determines that the steering mode of the driver is the passive steering (step ST10). In this case, the steering ECU 1 proceeds to step ST3 to reduce the attenuation torque increased in step ST9 and perform the normal dumping control, and proceeds to step ST1. In this case, the dumping gain computing unit 42 sets the increased dumping gain Gd to one, and the target current computing unit 41 computes the attenuation current value based on the dumping gain Gd=1 and computes the target assist current value based on the attenuation current value.

Thereafter, the driver shifts from the turning operation to the turning-back operation. When shifted to the turning-back operation, the attenuation torque is already reduced and the normal dumping control can be performed, as previously described, and hence the catching feeling at the time of the turning-back operation is suppressed. Thus, the sense of uncomfortable feeling felt by the driver when the turning-back operation is started is alleviated.

After further elapse of time, the steering direction determination unit determines that the change amount $\Delta \theta s$ of the steering angle $\theta s$ is smaller than zero in step ST5. That is, the steering direction determination unit determines that the steering operation of the driver is the turning-back operation at this stage. At this time, the process proceeds to step ST3 and the normal dumping control is performed. For example, the dumping gain computing unit 42 is configured to set the dumping gain Gd to one in the case of the turning-back operation. Thus, when determined as the turning-back operation, the target current computing unit 41 computes the attenuation current value based on the dumping gain Gd=1, and computes the target assist current value based on the relevant attenuation current value. At this time, the normal dumping control can be continued. Therefore, the catching feeling at the time of the turning-back operation felt by the driver is suppressed even after the turning-back operation is detected, and thus the sense of uncomfortableness is alleviated.

As described above, when the steering angle $\theta s$ reaches the vicinity of the maximum steering angle $\theta s_{max}$ by the turning operation, the steering control device of the present embodiment increases the attenuation torque in the assist control and reduces the target assist torque if the steering mode is the active steering. Thus, the steering control device can alleviate the impact load of when the steering angle $\theta s$ becomes the maximum steering angle $\theta s_{max}$ (at the time of end abutting) by the turning operation. Furthermore, when the steering angle $\theta s$ reaches the vicinity of the maximum steering angle $\theta s_{max}$ by the turning operation and the steering mode is switched from the active mode to the passive mode, the steering control device reduces the increased attenuation torque accompanying the reaching of the steering angle $\theta s$ to the vicinity of the maximum steering angle $\theta s_{max}$, and increases the target assist torque. In this case, the steering control device reduces the increased attenuation torque even if in the middle of the turning operation, and thus the catching feeling of when subsequently switched to the turning-back operation is suppressed. Thus, the steering control device can satisfy both the alleviation of the impact load at the time of the end abutting and the alleviation in the sense of uncomfortableness of the driver at the time of the turning-back operation (in particular, sense of uncomfortableness of the driver at the time of the turning-back operation of when the steering angle $\theta s$ is at the vicinity of the maximum steering angle $\theta s_{max}$).

A steering control device according to the embodiment of the present invention reduces the increasing attenuation torque even in the middle of the turning operation when a steering mode determination value becomes smaller than a predetermined value when an absolute value of the steering angle at the time of the turning operation is greater than or equal to a predetermined angle, that is, when the steering mode of the driver is a passive steering when the absolute value of the steering angle at the time of the turning operation is greater than or equal to a predetermined angle, so that the catching feeling of when switched to the turning-back operation later on can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A steering control device comprising:
   an assist controller configured to perform an assist control for alleviating an operation force with which a driver operates a steering wheel;
   an assist torque computer configured to compute a target assist torque in which an attenuation torque for suppressing a steering angle speed of the steering wheel is superimposed on a reference torque; and
   an active-passive determination processor configured to compute a steering mode determination value based on both of a result of multiplying the steering angle speed by a steering torque and a result of multiplying a steering angle by a time differential value of the steering torque the steering mode determination value representing a steering mode by the driver with respect to the steering wheel, each of the steering angle speed, the steering torque, the steering angle, and the time differential value of the steering torque being a parameter at a time of a steering operation of the steering wheel by the driver, wherein
   the assist torque computer is configured to increase the attenuation torque when an absolute value of the steering angle of the steering wheel at the time of a turning operation is not smaller than a predetermined angle compared to the attenuation torque when the absolute value of the steering angle is smaller than the predetermined angle, and to reduce the increased attenuation torque at a time the steering mode determination value becomes smaller than a predetermined value when the absolute value of the steering angle at the time of the turning operation is not smaller than the predetermined angle.

2. The steering control device according to claim 1, wherein the assist torque computer is configured to reduce the increased attenuation torque at the time the absolute value of the steering angle at the time of the turning operation is smaller than the predetermined angle.

* * * * *